April 23, 1968

P. A. G. LEPELLETIER 3,379,479

DYNAMIC PRESSURE CONVERTER, ESPECIALLY APPLICABLE
TO THE BRAKING SYSTEM OF AN AUTOMOBILE VEHICLE

Filed Jan. 4, 1967

INVENTOR

PIERRE ANDRÉ GEORGES LEPELLETIER

By Young & Thompson

ATTYS.

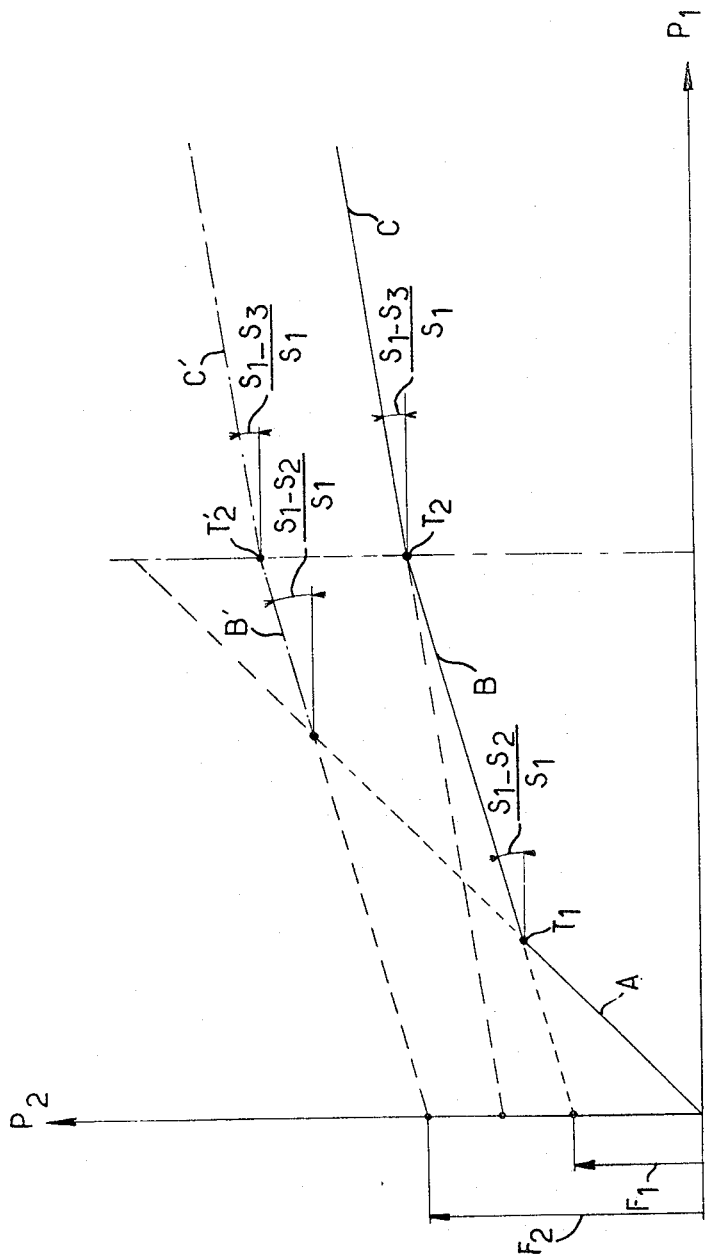

INVENTOR
PIERRE ANDRÉ GEORGES
LEPELLETIER
BY Young + Thompson
ATTYS.

United States Patent Office 3,379,479
Patented Apr. 23, 1968

3,379,479
DYNAMIC PRESSURE CONVERTER, ESPECIALLY APPLICABLE TO THE BRAKING SYSTEM OF AN AUTOMOBILE VEHICLE
Pierre André Georges Lepelletier, Chatou, France, assignor to Societe Anonyme Francaise du Ferodo, Paris, Seine, France, a corporation of France
Filed Jan. 4, 1967, Ser. No. 607,179
Claims priority, application France, Jan. 7, 1966, 45,143; Aug. 9, 1966, 72,515
18 Claims. (Cl. 303—22)

ABSTRACT OF THE DISCLOSURE

The present invention relates to a dynamic pressure-converter, especially applicable to braking systems of automobile vehicles, of the kind comprising a hollow body provided with at least two bores, and a piston of section $S_1$ having an axial rod of section $S_2$, said piston being arranged to slide in one of said bores and forming therein, on each side, a cylindrical chamber coupled to a utilization circuit such as a braking circuit. The annular chamber formed round the rod is coupled to a hydraulic control source such as a master-cylinder, while the rod slides in a second bore of the said hollow body. The piston rod is subjected to a variable orientated axial force F which is sometimes positive and sometimes negative, such as a force which is a function of the movements of the chassis of the vehicle with respect to a non-suspended point of the said vehicle. The piston comprises a controlled communication established between said chambers, said controlled communication being actuated in the direction of opening when the piston is in an extreme position of its sliding movement at which the volume of said cylindrical chamber is a minimum, said opening serving to equalize the pressure in the cylindrical chamber, known as the converted pressure, with the pressure in the annular chamber known as the control pressure. The controlled communication is actuated in the direction of closure as soon as the piston has moved by a pre-determined amount from the said extreme position. A ring is slidably interposed between the piston rod and the second bore of the hollow body, the bore then having a section $S_3$, greater than $S_2$, and the ring is subjected to a predetermined calibration force $f$ and is movable under the effect of the control pressure, acting against the calibration force between a first position in which it is firmly in abutment against a shoulder of the hollow body, and a second position in which it is fast in abutment against a shoulder of the piston rod, so that, when the controlled communication is closed, the rate of variation of the converted pressure is less than the rate of variation of the control pressure in a ratio equal to $$\frac{S_1 - S_2}{S_1}$$

as long as the ring is fast against the hollow body, and equal to $$\frac{S_1 - S_3}{S_1}$$

when the ring is fast in abutment with said piston rod.

---

The present invention has for its object a dynamic pressure converter which is especially applicable to the braking system of an automobile vehicle, of the kind comprising in particular a hydraulic control source for the control of the brakes of each axle of the said vehicle, and for at least one of the said axles, in practice the rear axle, pressure converter means interposed between the said source and the brakes of the said axle.

According to the invention, a dynamic pressure converter of this kind comprises a hollow body provided with at least two bores, and a piston of section $S_1$ provided with an axial rod of section $S_2$, the said piston sliding in one of the said bores and forming therein, on each side, a cylindrical chamber coupled to the braking circuit of the said axle and, around its rod, an annular chamber coupled to the said hydraulic control source such as a master cylinder, while the said rod slides in a second bore of the hollow body, and is characterized in that the said piston rod is subjected to an orientated variable axial force F such as a force which is a function of the oscillation of the chassis of the vehicle with respect to a non-suspended point of the said vehicle, in that the said piston comprises a controlled communication established between the said chambers, said controlled communication being actuated in the direction of opening when the piston is in an extreme sliding position for which the volume of the cylindrical chamber is a minimum, the said opening serving to equalize the pressure in the cylindrical chamber, known as the converted pressure, with the pressure in the annular chamber, known as the control pressure, and the said controlled communication being operated in the direction of closure as soon as the piston has moved by a pre-determined amount from the said extreme position, and in that a ring is slidably interposed between the piston rod and the said second bore of the hollow body, which bore has then a section $S_3$ greater than $S_2$, the said ring being subjected to a pre-determined calibration force $f$ and being movable under the effect of the control pressure and acting against the said calibration force, between a first position in which, in abutment against a shoulder of the hollow body, it is fast with this latter, and a second position in which, in abutment against a shoulder of the piston rod, it is fast with the said rod.

In this way, when the said controlled communication is closed, the rate of variation of the converted pressure is less than the rate of variation of the control pressure in a ratio equal to $$\frac{S_1 - S_2}{S_1}$$

as long as the ring is fast with the hollow body, and equal to $$\frac{S_1 - S_3}{S_1}$$

when this ring becomes fast with the piston rod.

By virtue of this arrangement which is applied in practice to the braking circuit associated with the rear axle of a vehicle, the braking control of this axle is effected in several distinct phases of operation, this staggering of the operation enabling the curve representing the pressure applied to the rear axle as a function of the pressure applied to the front axle to follow more closely the ideal theoretical curve.

As is well known, the ideal theoretical curve of braking torques has a parabolic shape which is again found in the case of braking pressures from the moment when the pressure-torque response of the brakes of the two front and rear axles is clearly defined, that is to say constant or subject only to slight variations. A dynamic pressure converter of this kind can thus be advantageously applied to such brakes so as to effectively produce a true dynamic torque converter.

In addition, according to the invention, the force F applied to the piston of the dynamic pressure converter is a function of the dynamic load on the rear axle, irrespective of the phase of operation, that is to say it is a function of the static load on this axle, and of the instantaneous variations of that load resulting from various accelerations applied to the vehicle at any given moment, due for example to braking, to an upward or downward slope in the road, to a curve or to a banking of a curve.

This force F can thus be positive at one moment and negative at the next, depending on whether the dynamic load on the rear axle is more or less large, with a neutral point at which it passes through zero.

In particular, during braking on no-load and at high decelerations during which the load carried by the rear action reaches its lowest value, the force F is negative and applies a tractive pull on the piston of the dynamic pressure converter, which results in a reduction of pressure in the braking circuit of this rear axle, and thereby prevents locking of this axle, which is always dangerous.

The dynamic pressure converter according to the invention thus works in all cases like a depression device, but the particular feature which it possesses of acting under traction as under thrust, conjointly with the staggering of the operation into several phases, considerably increases the scope of its use as compared with the pressure converters already known, especially by reason of the fact that it is possible to have operation curves located below the curve representing the operation of the depression device corresponding to a zero axial force on the piston rod, since this is precisely the object of the reversal of sign of this force.

In accordance with various particular forms of embodiment of the invention, the hollow body or the piston of the dynamic pressure converter is rigidly fixed to a non-suspended part of the vehicle, while the piston or the hollow body is coupled to the chassis of the vehicle through the intermediary of elastic means which are preferably of variable flexibility.

The present invention has also for its object a preferred form of construction of these elastic means with variable flexibility.

According to this preferred form of construction these means with variable flexibility comprise a cylindrical casing coupled to the chassis of the vehicle by a tie-rod articulated on the said chassis, said tie-rod being preferably adjustable in length; a cylindrical sleeve coaxial with the casing and freely movable in the casing, said sleeve having at least two transverse supporting collars, one directed outwards and the other inwards of the said sleeve; a first spring means supported on the one hand against the external collar of the sleeve and on the other hand against one of the transverse end walls of the casing; a guide sliding in the casing between an intermediate transverse wall of the casing and the other transverse end wall of the said casing, and coupled to a rod which is in turn connected to the main piston rod of the dynamic pressure converter, the said guide being intended to co-operate in abutment with the inside collar of the said sleeve; and a second spring means interposed between the said outside collar and a transverse flange of the said rod.

The first spring means is preferably of constant strength and there is associated with it a third spring means working in opposition and being supported on the one hand against the intermediate transverse wall of the casing and on the other hand against an intermediate transverse collar of the sleeve, the said third spring means being of variable strength as is also the second spring means.

This arrangement makes it possible to obtain a curve representing the variations of the braking torque applied to the rear axle as a function of the dynamic load on this rear axle, such that by reason of this variable flexibility, the variation in torque increases advantageously less rapidly for the high dynamic loads which correspond to a positive action of thrust on the piston of the pressure converter, and such that it is reduced more rapidly for the low dynamic loads which correspond to a negative action of traction on the said piston. This enables the curve representing the dynamic operation of the converter to be brought as close as possible to the desired ideal curve of parabolic shape.

The characteristic features and advantages of the invention will further be brought out in the description which follows below of one form of construction given by way of example and without limitation, reference being made to the accompanying drawings, in which:

FIG. 3 is a diagram illustrating the operation of this dynamic pressure converter;

Figure 1:
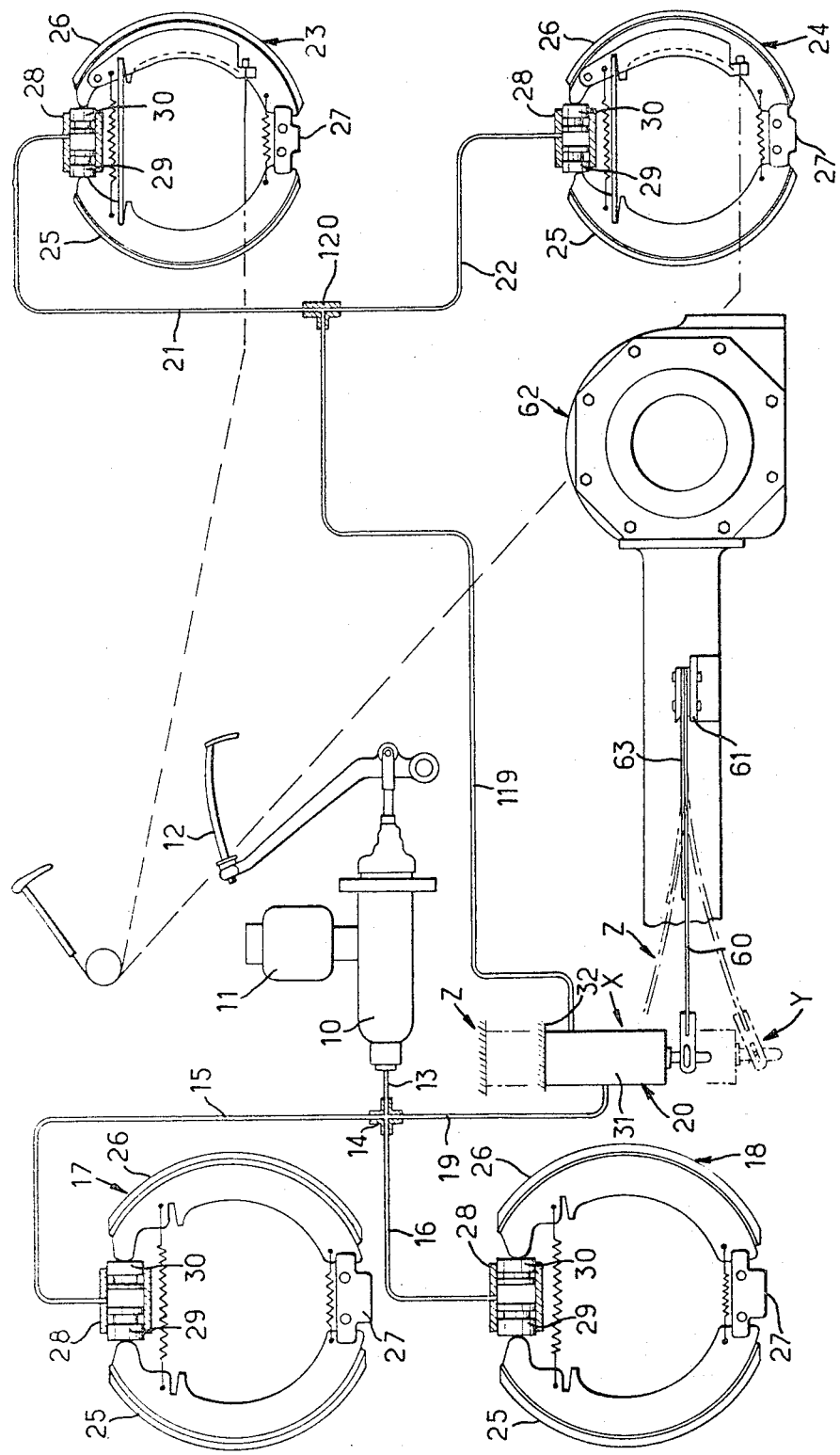
FIG. 1 is a general diagrammatic view of a braking system.

In FIG. 1 there will be recognized a braking system comprising a master-cylinder 10 provided with a tank 11, and a control pedal 12 which is adapted to drive oil into a conduit 13 connected at 14 on the one hand to the conduits 15 and 16 for supplying the front brakes 17 and 18, and on the other hand to a conduit 19 which is extended beyond the pressure converter device 20 detailed below, by a conduit 119 connected at 120 to two conduits 21 and 22 for supplying the rear brakes 23 and 24.

Each of the brakes 17, 18, 23 and 24 is of the usual type with jaws and comprises a compressed jaw 25 on forward running and a tensioned jaw 26, which are supported against a fixed abutment 27 and which are actuated by a hydraulic cylinder 28 in which two pistons 29 and 30 are adapted to slide in opposite directions.

Figure 2:
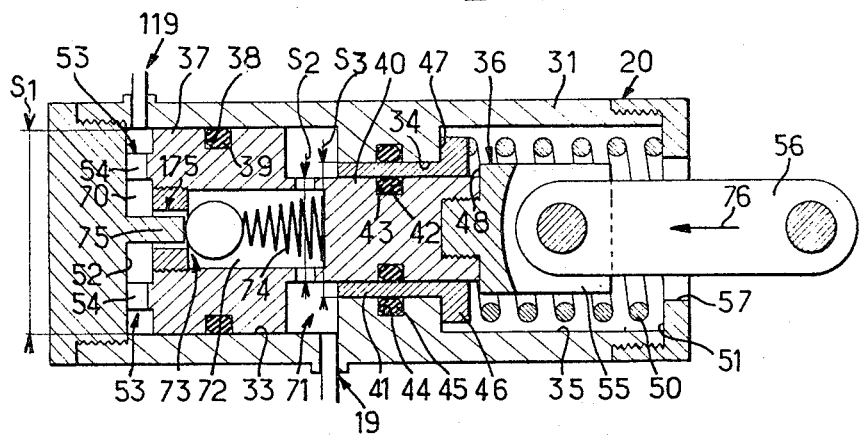
FIG. 2 is an axial section of the dynamic pressure converter according to the invention, applied to the above braking system.

The pressure converter device 20 shown in detail in FIG. 2, comprises a body 31 rigidly fixed to the body of the vehicle, this latter body having been shown diagrammatically at 32 in FIG. 1. In the body 31 are formed two coaxial bores 33 and 34, followed by a third accessory bore 35, located successively in line with each other, the central bore 34 having a section S3 less than that of the other two, and especially less than the section S1 of the bore 33.

In the body 31 is mounted a piston 36 comprising a first cylindrical portion 37 or piston proper, sliding in the bore 33 of the body 31 and provided at its periphery with a groove 38 fitted with a sealing joint 39, and a second cylindrical portion 40 forming a rod of section S2 less than the section S3 of the bore 34 of the body 31.

This second portion 40 or rod is enclosed by a ring 41 interposed between this portion and the bore 34 of the body 31, fluid-tightness of this assembly being ensured on the one hand by a joint 32 disposed in a groove 33 of the portion 40 of the piston and on the other hand by a joint 34 mounted in a groove 45 of the bore 44 of the body 31. The ring 41 which slides with light friction between the portion 40 of the piston 36 and the bore 34 of the body 31 is provided at one of its extremities with an annular collar 46 intended to come into abutment, either against a shoulder 47 of the body 31 or against a shoulder 48 of the piston 36, and is urged in the direction of the shoulder 47 of the body 31 by a pre-stressed calibration spring 50. This latter is of low strength and is supported against a bottom 51 which partly closes the bore 35 of the body 31; the chamber thus formed by this latter is at atmospheric pressure.

Facing the bottom 52 of the bore 33 of the body 31, the piston 36 is provided with supporting feet 53 through which pass conduits 54. At its other extremity, the piston 36 comprises a fork 55 on which is articulated a connecting rod 56 passing through the bottom 51 of the bore 35 by an opening 57 formed for that purpose in this bottom.

As can be seen from FIG. 1, the connecting rod 56 is articulated in a bi-lateral manner on an elastic blade 60 fixed at 61 inside the rear axle 62 of the vehicle, or on any other non-suspended member of the vehicle. With the elastic blade 60 is associated an elastic backing blade 63 arranged in such manner as to act when the blade 60 is elastically deformed upwards.

The bearing surface 37 of the piston 36 forms in the bore 33 of the body 31 a cylindrical chamber 70, to which is coupled the conduit 119, and conjointly with the bearing surface 40 or rod of the piston and with the ring 41, an annular chamber 71 to which is connected the conduit 19. The chambers 70 and 71 communicate with each other by a passage 72 formed in the piston 36, in which passage is interposed a ball valve 73 urged towards its closure by a string 74 and towards its opening by a finger 75 projecting from the bottom 52 of the bore 33.

This finger 75 has a length such that it only comes into action when the piston 36 is in the vicinity of its extreme sliding position, at which its feet 53 come into contact with the bottom 52 of the bore 33 of the body 31, the volume of the chamber 70 being then reduced to a minimum.

In the text which follows, the transverse section of the bore 175 by which the passage 72 opens into the chamber 70 is assumed to be negligible as compared with the section $S1$ of this chamber, that is to say with the section of the bearing surface 37 of the piston 36.

Reference will now be made to FIG. 3 which is a diagram of operation, on which there is plotted in abscissae the pressure $P1$ or control pressure which exists in the chamber 71 and in ordinates the pressure $P2$ or converted pressure which exists in the chamber 70 when the user presses on the brake pedal, the vehicle being stationary.

By its construction, the elastic blade 60 has a shape such that, when the vehicle is empty and stationary, it applies to the piston 36 a force F in the direction of the arrow 76 of FIG. 2, that is to say in a positive direction of so-called thrust, for which the feet 53 of the piston 36 come into contact against the bottom 52 of the bore 33 of the body 31, as shown in FIG. 2. The valve 73 is therefore normally open and the chambers 70 and 71 are at same pressure.

In consequence, when the vehicle is stationary, if the driver of the vehicle presses down the pedal 12, the pressure $P1$ in the chamber 71 increases and the pressure $P2$ in the chamber 70 increases in the same proportion.

The point representative of the corresponding operation describes, during the course of this first phase, a straight line starting from the origin at 45°. This straight line has been shown at A in FIG. 3. The pressure in the chamber 70 is applied against the piston 36 over one face of the section $S1$ of this latter, while in the chamber 71, this same pressure is applied over one face of the surface $S1-S2$ of the piston 36, and this latter has therefore a tendency to move towards the right-hand side of the figure and in this movement the valve 73 becomes closed.

Starting from that moment, corresponding to the point of transition T1 in FIG. 3, the chambers 70 and 71 are no longer in communication, and the rates of increase in pressure in the chambers 70 and 71 are then in the same ratio to each other as the sections $$\frac{S1-S2}{S1}$$

the pressure $P2$ remaining less than the pressure $P1$.

During the course of this second phase of operation, the corresponding representative point describes a straight line B, the slope of which is given by this ratio of sections, the ordinate F1 at the origin of this straight line B corresponding to the state of loading of the rear axle when the vehicle is stationary. If this condition of load were different, F2 for example, the representative point of the second phase of operation would then follow a straight line B' parallel to the straight line B.

If the user increases his action on the brake pedal, the pressure in the chamber 71 increases and a moment arrives when it is sufficient for the corresponding force applied to the ring 41 to overcome the pre-stress $f$ of the calibration spring 50 and by this means to cause the displacement of the ring 41 towards the right until this latter comes into contact with the shoulder 48 of the piston 38 and becomes so to speak fast with this piston.

During the course of the third phase of operation which begins at this instant, the rates of increase of pressure in the chambers 70 and 71 are determined by the new ratio of sections $$\frac{S1-S3}{S1}$$

less than the previous ratio.

In consequence, the representative point of this third phase of operation is located on a straight line C having a slope less than the lower straight line B, and the ordinate of which at the origin differs from that of the straight line B by an amount which depends on the calibration spring 50.

If the load on the rear axle were different, F2 for example, the representative point of the third phase of operation would describe a straight line C' parallel to C. It is important to note that the points of transition T2 and T'2 between the straight lines B and C on the one hand and between B' and C' on the other, are located on the same vertical line, the position of which depends on the calibration spring 50. The variations in stress of this latter during the subsequent movement of the piston are assumed to be negligible.

It will be noted that the operation of this pressure-converting apparatus is split-up into three phases and this division is made possible by the movement of the ring 41.

It will be understood that by arranging between the bearing surface 40 of the piston 36 and the bore 34 of the body 31, a number of similar rings successively engaged one in the other, it is possible to split-up this operation into a larger number of phases.

It will now be assumed that the vehicle is running. The piston 36 is then urged by the elastic blade 60, to the action of which is subsequently added that of the backing blade 63, in response to variations in the dynamic load on the rear axle 62, that is to say in response to the movements of the vehicle body 32 with respect to the said axle 62.

In FIG. 1, the position of the vehicle body and therefore of the body 31 of the pressure converter 20 when the vehicle is empty and stationary has been shown in full lines X, in chain-dotted lines Y the position of these members when the axle 62 is overloaded, and in chain-dotted lines Z the position of this member when the axle 62 is freed from its load.

These modifications of load may result either from an effective modification of the static load on the axle or from instantaneous variations of this load due to the various accelerations which are undergone by the vehicle at a given moment, resulting for example from a braking action, an upward or downward slope of the road, from a curve or from the banking of a curve, and quite generally from any continuous combination of these various factors.

It will be noted that when the axle 62 is overloaded, the elastic blade 60 pushes the piston 36 in the direction of the bottom 52 of the body 31, while when the axle 62 is freed from its load, the elastic blade 60 assisted by the elastic backing blade 63, pulls down the piston 36.

Referring again to FIG. 3, it will be understood that the load carried by the rear axle diminishing during a braking action by reason of the resulting deceleration of the vehicle, the elastic blade 60, assisted by the elastic backing blade 63, applies an increased tractive force on the piston 36 which causes an additional reduction of the pressure in the braking circuit of this axle, and thereby prevents this axle from becoming locked in such a case of load removal, which is generally at the same time the most frequent and the most dangerous. The pressure P2 in the braking circuit of the axle 62 passes progressively, in accordance with the control pressure P1 applied by the user, from a higher curve corresponding to a given state of loading to a lower curve corresponding to a state of absence of load.

There will now be described with reference to FIG. 4 an alternative form of construction of the pressure-converter associated with elastic means having variable flexibility which, according to the present alternative, couple the piston rod 40 to the chassis of the vehicle, which has been shown diagrammatically by a continuous line 32 on this FIG. 4, while the body 31 is rigidly fixed to a non-suspended point of the vehicle.

This alternative form differs slightly from the form of construction described with reference to FIG. 2, in that the calibrated spring 50 is supported, not directly on the collar 46 of the ring 41, but on the extreme collar of a sleeve 246, provided at its other extremity with an internal collar for engagement with the collar 46 of the ring 41.

Figure 4:
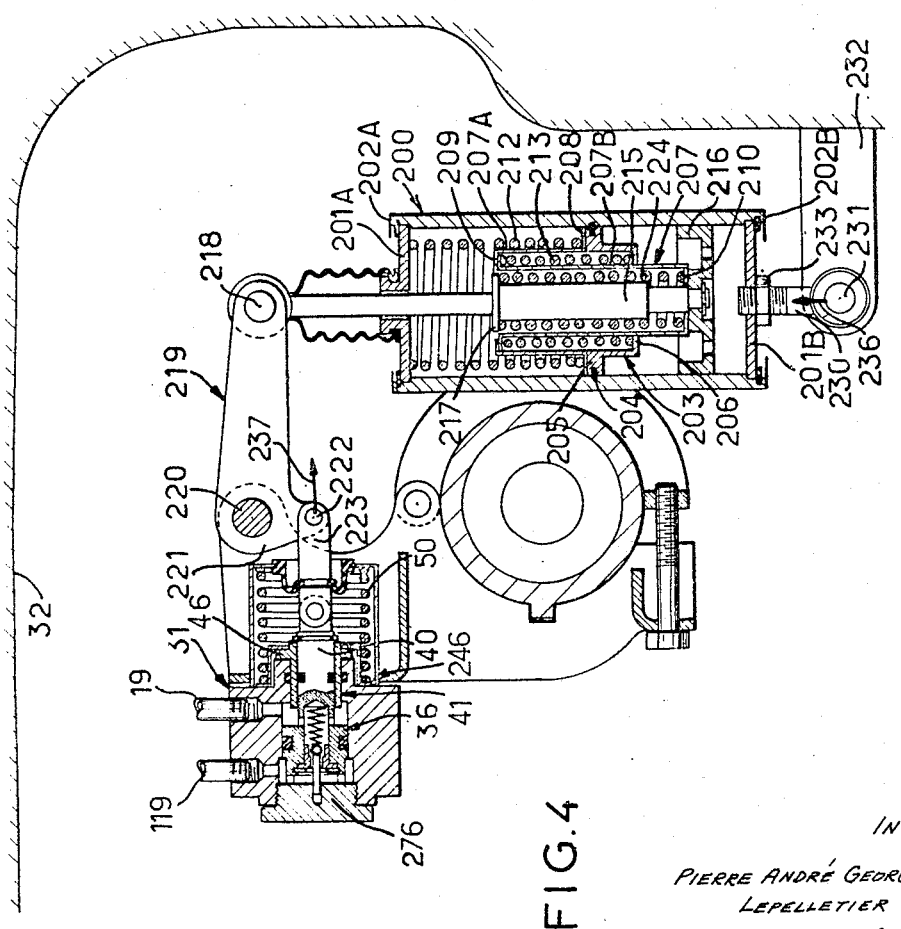
FIG. 4 is a view in cross-section to a different scale of an alternative form of construction of the pressure converter according to the invention installed on a vehicle at a non-suspended point of the vehicle, in combination with coupling means of variable flexibility which couple its piston to the chassis of the vehicle.

The elastic means with variable flexibility shown in FIG. 4 are an alternative form of the assembly constituted by the elastic blade 60 and the associated elastic backing blade 63 described with reference to FIG. 1, and comprise a cylindrical casing 200 closed at each of its extremities by a transverse wall, 201A and 201B respectively; these walls are held in position by circlips 202A and 202B respectively. The casing 200 is provided internally with a further transverse wall 203, which is also retained by means of a circlip 204 and which has two annular bearing surfaces displaced axially, namely an annular external bearing surface 205 and an annular internal bearing surface 206.

Inside the casing 200 is mounted so as to be freely movable a sleeve 207 having three supporting collars displaced axially, namely an external collar 208, an intermediate collar 209 and an internal collar 210, the external collar 208 occupying an axial position intermediate with respect to the other two.

In practice, the sleeve 207 is formed by two concentric sleeves 207A and 207B spaced at a distance from each other and associated by welding at the level of contact collars forming the intermediate collar 209 of the assembly. A first spring 212 having a constant strength is arranged between the end wall 201A of the casing 200 and the external collar 208 of the sleeve 207. A second spring 213 is arranged between the intermediate collar 209 of the sleeve 207 and the internal supporting collar 206. This spring 213 has a strength which is variable in dependence on its elongation.

At the centre of the sleeve 207 is provided a rod 25 coupled to a guide 216 sliding freely between the intermediate wall 203 and the end wall 201B of the casing 200. The rod 215 is provided with a transverse flange 217 and is articulated at 218 to a cranked lever 219 which is in turn articulated in its cranked zone at 220 to a non-suspended point of the vehicle. The other extremity 221 of the cranged lever 219 is articulated at 222 on an extension 223, which is in turn articulated on the piston rod 40 of the dynamic pressure converter according to the invention.

A third spring 224 of variable strength is arranged between the flange 217 of the rod 215 and the internal collar 210 of the sleeve 207.

The casing 200 is coupled to the chassis 32 by a tie-rod 230 engaged by screwing into the end wall 201B of the casing and articulated at 231 on a bracket 232 rigidly fixed to the chassis 32. A locking nut 233 enables the active length of the tie-rod 230 to be regulated; this adjustment is effected by rotation of the casing 200 after slackening back the lock-nut 233.

When no force is applied to the tie-rod 230 in one direction or in the other, the various members contained in the casing 200 occupy the position shown in FIG. 4, that is to say in particular that the sleeve 207 is in abutment, on the one hand against the intermediate wall 203 of the casing by its external collar 208, and on the other hand against the guide 216 by its internal collar 210.

If, for example, during a braking action, the chassis 32 is lifted with respect to the rear axle, which results in a removal of load from this latter, the casing 200 is subjected to an upward movement, as shown by the arrow 236 in FIG. 4. In this movement, the sleeve 207 and the casing 200 are carried upwards and the spring 202, which is thus arranged between two members which are displaced at the same time, is not affected. This is also the case for the spring 213.

On the other hand, the sleeve 207 applies a compressive action to the spring 224, the other supporting point of which is the flange 217 of the rod 215, this rod being fixed since it is keyed on the crank lever 219. The guide 216 remains stationary, and the casing 200 slides over this guide.

As the spring 224 is urged into compression, it acts upon, through the intermediary of the flange 217 of the rod 215 and of the lever 219, the piston 36 of the pressure-converter, this action being applied in traction in the direction of the arrow 237 of FIG. 4.

If, on the other hand, the chassis 32 moves downwards with respect to the rear axle, the casing 200 is drawn towards the bottom of FIG. 4 and the sleeve 207 is held in position by the guide 216 which remains stationary. In consequence, the spring 212 is forced into compression, while the spring 213 is expanded and the spring 224 is not acted upon. Thus, through the intermediary of the guide 216 of the rod 215 and of the lever 219, the springs 212 and 213 apply a thrust force to the piston 36 of the dynamic pressure converter in a direction opposite to that indicated by the arrow 237 of FIG. 4.

Figure 5:
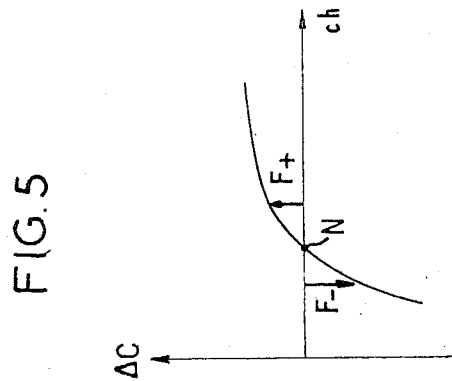
FIG. 5 is a diagram illustrating the operation of the above coupling means with variable flexibility.

In the above case of operation, the springs 212 and 211 thus work in opposition and in consequence, the variations of the corresponding force applied to the piston rod take place following a rate lower than that corresponding to the force applied in the previous case, as is illustrated in FIG. 5.

In this figure, the dynamic load Ch on the rear axle has been plotted in abscissae while the ordinates represent the variations ΔC of the braking torque applied to the rear axle. The representative curve meets the axis of the abscissae at a point N, at which no action is applied by the chassis on the dynamic pressure-converter. The portion of the representative curve which is to the right of this point N corresponds to a so-called positive thrust action (F+) and the portion to the left of the point N corresponds to a so-called negative traction force (F−) on the part of the chassis.

As can be clearly seen from FIG. 5, the rate of variation of the braking torque is lower in the thrust zone (F+) than in the traction zone (F−).

Figure 6:
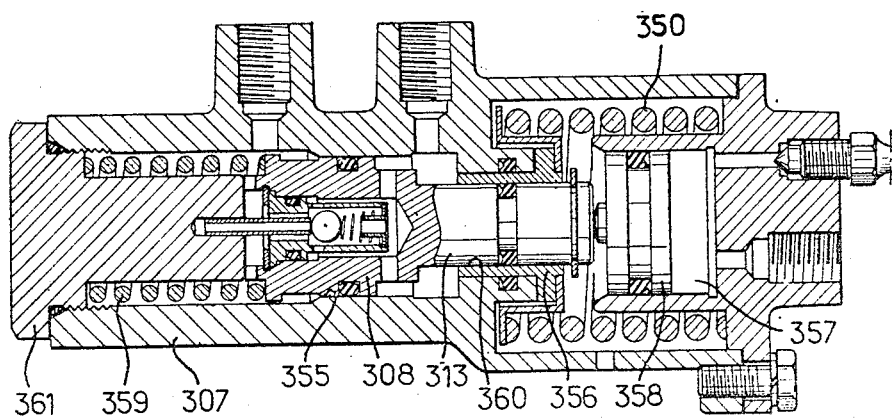
FIG. 6 is a view in axial section of a further alternative form of construction of the pressure converter according to the invention, especially intended for mounting on a vehicle which is provided with a hydraulic suspension.

In FIG. 6, there has been shown a detailed axial cross-section of another alternative form of construction of the dynamic pressure-converter in accordance with the invention which is particularly applicable to vehicles provided with a hydraulic suspension.

An alternative construction of this kind will be given only a brief description as follows: the piston 308 slides in a bore 355 of the hollow body 307, and is coupled to a rod 313 sliding in an intermediate ring 356 which in turn slides in a bore 360 of the hollow body, acting in opposition to a spring 350.

According to the present alternative form, the orientated force P applied in accordance with the invention to the piston 308 is derived from the pressure existing in a chamber 357, this pressure being transmitted to the piston rod 313 by an intermediate piston 358, slidably mounted in the chamber 357. In the case where the vehicle is equipped with a hydraulic suspension, the pressure 357 is preferably controlled, directly or indirectly, in dependence on the pressure which exists in the hydraulic circuit of the said suspension.

At the other extremity, an opposing spring 359 is interposed between the piston 308 and a plug 361 which closes the corresponding extremity of the hollow body 307.

The operation of this alternative arrangement is identical with that of the preceding alternative.

As the piston 308 is subjected, through the intermediary of the piston 358, by the suspension to an action by hydraulic pressure, which is therefore always positive, the spring 359 must have a force sufficient to permit the piston 308 to be subjected to a positive or negative action. Thus, for small loads, the piston will be subjected to a traction effect, the strength of the spring 359 then exceeding the effect of the suspension pressure.

Preferably, and in order to correspond to the mechanical combination of the elastic blades 60 and 63, the variation of the action on the piston 308 of the hydraulic pressure of the suspension is chosen to be greater over the range of small dynamic loads on the rear axle than over the range of high dynamic loads, with a variation which is advantageously continuous. For example, the hydraulic suspension is chosen to have a variable flexibility, that is to say the pressure of suspension does not vary in a linear manner with the load and preferably increases in accordance with a law of damping as a function of the load.

In accordance with an alternative form (not shown), the calibration spring 350 of the ring 356 and the spring 359 are constituted by one single spring interposed between the said ring and a shoulder of the rod 313 of the piston 308. A construction of this kind corresponds to the case in which the characteristics of the spring 350 correspond to those of the spring 359.

It will of course be understood that the present invention is not limited to the forms of embodiment described and shown, but includes all alternative forms of construction, especially as regards the calibration means of the ring 41, which could be hydraulic, electro-magnetic or the like, and which could be variable, for example in dependence on any desired factor of the type comprising braking pressure at any desired point of the circuit, load on one axle of the vehicle or on both axles, etc.

Similarly, the piston could be acted upon by driving means other than the means responsive to the dynamic load on one axle which has more particularly been described above.

It will also be understood that the braking circuit of an axle could comprise two dynamic pressure-converters of the type described above, each respectively associated with one of the brakes of the axle. The brakes of the vehicle could also be of a type different from that described and shown.

What I claim is:

1. A dynamic pressure-converter, especially applicable to the braking systems of automobile vehicles, of the kind comprising a hollow body provided with at least two bores, and a piston of section S1 provided with an axial rod of section S2, said piston being adapted to slide in one of said bores and forming therein, a cylindrical chamber coupled to a utilization circuit such as a braking circuit and, around its rod, an annular chamber coupled to a hydraulic control source such as a master-cylinder, while said rod slides in a second bore of said hollow body: in which said piston rod is subjected to a variable orientated axial force F which is sometimes positive and sometimes negative such as a force which is a function of the movements of the chassis of said vehicle with respect to a non-suspended point of said vehicle; in which said piston comprises a controlled communication means established between said chambers, said controlled communication means being actuated in the direction of opening when the piston is in an extreme sliding position at which the volume of said cylindrical chamber is a minimum, said opening serving to equalize the pressure in the cylindrical chamber, known as the converted pressure, with the pressure in the annular chamber, known as the control pressure, said controlled communication means being actuated in the direction of closure as soon as the piston has moved by a pre-determined amount from said extreme position; and in which a ring is slidably interposed between said piston rod and said second bore of the hollow body, which second bore has a section S3 greater than the section of the axial rod S2, calibrated means subjecting said ring to a pre-determined calibration force $f$ and movable under the effect of the control pressure and against said calibration force between a first position in which, in abutment against a shoulder of the hollow body it is held in abutment with the latter, and a second position in which, in abutment against a shoulder of the piston rod it is held in abutment with said rod, whereby, when said controlled communication means is closed, the rate of variation of the converted pressure is then less than the rate of variation of the control pressure in a ratio equal to $$\frac{S1-S2}{S1}$$

as long as said ring is held in abutment with the hollow body, and equal to $$\frac{S1-S3}{S1}$$

when said ring becomes fast with said piston rod.

2. A dynamic pressure-converter as claimed in claim 1, one of the hollow body and the piston being rigidly fixed to the chassis of said vehicle, while a bilateral coupling is established between the other and the rear axle of said vehicle.

3. A dynamic pressure-converter as claimed in claim 2, in which said bilateral coupling is effected by means of an elastic device.

4. A dynamic pressure-converter as claimed in claim 3, in which said elastic device is of variable flexibility.

5. A dynamic pressure-converter as claimed in claim 1, in which the condition of opening of said controlled communication means is obtained while at rest.

6. A dynamic pressure-converter as claimed in claim 1, in which said controlled communication means comprises a ball-valve, the opening of said valve being effected by a finger fixed to said hollow body.

7. A dynamic pressure-converter as claimed in claim 1, in which said calibration force $f$ is supplied by said calibrated means comprising a spring interposed between said ring and a shoulder of said hollow body in the interior of a chamber of this latter which is connected to atmosphere.

8. A dynamic pressure-converter as claimed in claim 1, in which, in combination with a hydraulic suspension, said piston rod is subjected at its extremity to a pressure defined by the pressure of the hydraulic circuit of said suspension, calibrated elastic restoring means being provided so as to act in opposition to the action on the piston rod of said suspension pressure.

9. A dynamic pressure-converter as claimed in claim 8, in which the calibration of said elastic restoring means is provided so as to be sufficient to create, in combination with the suspension pressure, the axial force F which is sometimes positive and sometimes negative.

10. A dynamic pressure-converter as claimed in claim 9, in which the calibrated spring associated with said ring and said elastic restoring means which oppose the action on the piston rod of the suspension pressure, are combined to form a single spring.

11. A dynamic pressure-converter as claimed in claim 1, in which said hydraulic control force is constituted by a master-cylinder, by one of the circuits of a self-stabilizing device, or by any other appropriate source of pressure.

12. A dynamic pressure-converter as claimed in claim 4, in which said elastic device of variable flexibility comprises: a cylindrical casing coupled to the chassis of said vehicle by a tie-rod articulated on said chassis, a cylindrical sleeve coaxial with said casing and freely movable in said casing, said sleeve having at least two transverse supporting collars, one directed towards the exterior and the other towards the interior of said sleeve, a first spring means supported on the one hand against the external collar of said sleeve and on the other hand against one of the transverse end walls of said casing, a guide adapted to slide in said casing between a transverse intermediate wall of the casing and the other transverse end wall of said casing, and coupled to a rod which is connected to the piston rod of said dynamic pressure-converter, said guide being intended to co-operate in abutment with the internal collar of said sleeve, and a second spring means interposed between said external collar and a transverse flange of said rod.

13. A dynamic pressure-converter as claimed in claim 12, in which said first spring means is of constant strength.

14. A dynamic pressure-converter as claimed in claim 12, in which a third spring means is associated with said first spring means, said third means working in opposition and being supported on the one hand against the intermediate transverse wall of said casing and on the other hand against an intermediate transverse collar of said sleeve.

15. A dynamic pressure-converter as claimed in claim 14, in which said third spring means is of variable strength.

16. A dynamic pressure-converter as claimed in claim 12, in which said second spring means is of variable strength.

17. A dynamic pressure-converter as claimed in claim 12, in which the rod of said sliding guide is coupled to the piston rod of said converter by a cranked lever articulated at its extremities on the two said rods and at its cranked portion on a non-suspended point of said vehicle.

18. A dynamic pressure-converter as claimed in claim 12, in which the tie-rod of said casing is adjustable in length.

References Cited

UNITED STATES PATENTS

| 3,233,947 | 2/1966 | Oberthur | 303—22 |
| 3,237,997 | 3/1966 | Kerr | 303—22 |

MILTON BUCHLER, *Primary Examiner.*

J. J. McLAUGHLIN, *Assistant Examiner.*